United States Patent
Ulander

(10) Patent No.: US 6,466,156 B1
(45) Date of Patent: Oct. 15, 2002

(54) METHOD OF DETECTING OBJECTS THAT CHANGE WITH TIME BY MEANS OF A SAR RADAR

(75) Inventor: Lars Ulander, Linköping (SE)

(73) Assignee: Totalforsvarets Forskningsinstitut, Stockholm (SE)

(*) Notice: Subject to any disclaimer, the term of this patent is extended or adjusted under 35 U.S.C. 154(b) by 0 days.

(21) Appl. No.: 09/926,075
(22) PCT Filed: Feb. 7, 2000
(86) PCT No.: PCT/SE00/00231
§ 371 (c)(1),
(2), (4) Date: Aug. 24, 2001
(87) PCT Pub. No.: WO00/50921
PCT Pub. Date: Aug. 31, 2000

(30) Foreign Application Priority Data

Feb. 26, 1999 (SE) .................................. 9900692

(51) Int. Cl.⁷ .............................................. G01S 13/90
(52) U.S. Cl. .................. 342/25; 342/159; 342/189; 342/192; 342/195
(58) Field of Search ............................ 342/25, 27, 28, 342/89, 90, 91, 92, 93, 175, 189, 190–197, 159–164

(56) References Cited

U.S. PATENT DOCUMENTS

| | | |
|---|---|---|
| 4,866,446 A | 9/1989 | Hellsten |
| 4,866,466 A | 9/1989 | van der Waal |
| 4,965,582 A | 10/1990 | Hellsten .................. 342/25 |
| 5,497,158 A * | 3/1996 | Schmid et al. .............. 342/90 |
| 5,539,408 A * | 7/1996 | Moreira et al. ............. 342/25 |
| H1720 H * | 4/1998 | Chen ........................ 342/25 |
| 5,805,099 A * | 9/1998 | Nagata ...................... 342/25 |
| 5,818,383 A | 10/1998 | Stockburger et al. ...... 342/109 |
| 5,959,566 A * | 9/1999 | Petty ........................ 342/25 |
| 5,969,662 A | 10/1999 | Hellsten |
| 6,023,235 A * | 2/2000 | Sauer ....................... 342/25 |
| 6,204,800 B1 * | 3/2001 | Neumann .................. 342/25 |

FOREIGN PATENT DOCUMENTS

| | | |
|---|---|---|
| GB | 2 223 642 A | 4/1990 |
| WO | 98/58275 A1 | 12/1998 |

OTHER PUBLICATIONS

Proceedings of the SPIE, vol. 2757, 1996; Corr; Automatic Change Detection in Space Borne Sar Imagery; pp. 58–69.

* cited by examiner

Primary Examiner—Bernarr E. Gregory
(74) Attorney, Agent, or Firm—Jacobson Holman PLLC

(57) ABSTRACT

A method of detecting, by means of a SAR radar, objects that change with time within a ground area. The SAR radar is supported by a platform in essentially rectilinear motion during a synthetic aperture and the ground area is reproduced at least twice in succession from different synthetic apertures. A two-dimensional SAR image is generated from each synthetic aperture. The SAR images are matched with each other by a method in which each image position in one image is associated with the same ground area in the other image, the images being filtered, knowing location data for the antennae and based on the fact that the cylinder geometry of the SAR images is projected onto the ground surface, so that only common spectral components of the reflectivity of the ground are extracted and used in the matching.

14 Claims, 6 Drawing Sheets

METHOD OF DETECTING OBJECTS THAT CHANGE WITH TIME BY MEANS OF A SAR RADAR

This is a nationalization of PCT/SE00/00231, filed Feb. 7, 2001, and published in English.

BACKGROUND OF THE INVENTION

1. Field of the Invention

The present invention relates to a method of detecting objects that change with time, see FIG. 1, by means of a radar with synthetic aperture—a SAR radar. An important application is detection from an airborne platform of objects concealed in forest vegetation, which change their character, position, orientation or a combination thereof between two or more radar overflights. In such a situation, optical radiation, infrared radiation and microwave radiation are blocked or fluctuate to such an extent that it is not possible to carry out such detection using prior-art technique.

2. Description of the Related Art

SAR is a known technique for two-dimensional high-resolution ground mapping. A platform, such as an aircraft or satellite, moves along a nominal straight path and illuminates a large ground area by means of an antenna. Short pulses, or alternatively long coded signals compressed by means of pulse compression technique, are transmitted from the antenna and the return signal from the ground is received by the antenna and registered by the system along the straight path. By signal processing, high resolution is accomplished both along and transversely of the straight path. A condition for this is that the position of the antenna is known or can be calculated within a fraction of the wavelength and that the radar system is coherent, i.e, the relative amplitude and phase of the transmitted and received radar signal are known. Moreover, the ground and the propagation conditions have to be invariable during the overflight. The optimum geometric resolution that can be provided by means of SAR is determined by centre frequency $f_c$ and bandwidth B of the transmitted signal and the projection angle $\psi$ between the surface normal of the ground and the image normal $\bar\psi$, and the aperture angle $\Delta\theta$, over which the ground area is illuminated by the antenna, along the straight path according to the formula $$\Delta A = \frac{c^2}{\Delta f_c \cdot B \cdot \Delta\vartheta \cdot \cos\psi} \quad (1)$$

The SAR technique has been applied in a very wide frequency range, about 20 MHz–100 GHz. The choice of frequency (wavelength) determines largely which ground structures are reproduced since the backscattered return signal is affected above all by structures whose extent is of the wavelength order. Moreover, the wavelength determines the capability of penetrating different media, i.e. the penetration of the wave generally increases with a decreasing frequency. For example, this method can be used to adapt the penetration to reproduce different ground layers. In connection with, for instance, vegetation, the attenuation is insignificant for frequencies below 100 MHz and very great for frequencies above 10 GHz. Thus the capability of penetrating vegetation decreases gradually with an increasing frequency, and a practical limit for detecting objects concealed in vegetation is about 1 GHz. SAR systems which operate below and above 1 GHz, respectively, are in the following thus referred to as low-frequency and high-frequency systems, respectively.

The SAR technique can be accomplished with a small and a great fractional bandwidth (ratio between bandwidth and centre frequency), so-called narrowband and broadband SAR, respectively. In the case of a small fractional bandwidth, the resolution is coarse, in relation to the wavelength and the resolution element generally contains many scattering elements which are superposed with amplitude and phase. From objects in the nature, thus interference is random, which results in so-called speckle noise. The SAR signal from the ground will also be strongly dependent on the direction of observation of the SAR radar since the relative distance changes between the scatterers within the resolution cell will be great in relation to the wavelength, which results in a significantly changed interference pattern. In the case of a great fractional bandwidth, however, the resolution is of the wavelength order and therefore the interference pattern does not change significantly with the direction of observation. Thus the SAR signal will be almost free from speckle noise.

Detection of stationary objects, such as vehicles or houses, requires that they can be discriminated from the background signal, so-called clutter. The latter originates from objects appearing in nature, such as trees and rocks, which are of the wavelength order or larger. The simplest method of detection thus is based on thresholding the SAR image based on the local statistic distribution for the background. The threshold value is set so that the number of false detections (false alarms) is kept at a low and known level. Consequently detection performance is determined mainly by the signal/clutter ratio. The most important system parameters which primarily control detection performance thus are wavelength and geometric resolution. Secondary system parameters are, inter alia, polarisation and angle of incidence.

It is also possible to use characteristic features for discriminating an object from its background, for example, by predefined patterns from an object database. A condition is, however, that the pattern signature is fairly invariable in space and time, from different directions of illumination and in different backgrounds, and that the geometric resolution is significantly finer than the size of the object. According to experience, the geometric resolution must be at least in the order of 0.3 m or better to achieve a robust detection of objects in the size of a vehicle. This corresponds to about 10×10 resolution cells being contained in the object. A basic problem of pattern recognition of this kind is, however, that the detection is achieved at the cost of significantly reduced detection capacity. Compared with simple thresholding based on 1 resolution cell per object and given a certain system bandwidth, the detection capability is thus reduced by about 100 times in the case of pattern recognition.

Detection of changes by means of narrowband high-frequency SAR is a known technique for detecting objects which change their character between two points of time. SAR images from two or more straight paths are combined. A drawback of this technique is that the speckle pattern in the two images often decorrelates. The speckle pattern will be fully uncorrelated if the straight paths deviate from each other by more than a critical value. The angle over which the speckle pattern is uncorrelated is inversely proportional to the extent of the resolution volume expressed in half wavelengths.

For high-frequency radar backscattering from forest vegetation, the extent of the resolution volume in the vertical direction is tens to hundreds of wavelengths, i.e. much greater than the wavelength, which means that the speckle pattern is quite uncorrelated also for such a small angular difference as about one degree. Besides, it is a considerably more serious condition that the speckle pattern decorrelates owing to small temporal changes in the vegetation. Thus it is sufficient with changes which are but a fraction of the wavelength for the speckle pattern to change, for example by leaves, needles or branches changing their relative positions on the wavelength scale. This so-called temporal decorrelation dominates the change of the speckle pattern of the vegetation in high-frequency SAR. Furthermore its nature is essentially chaotic since it is caused by uncontrollable environmental parameters, such as wind, moisture and temperature. All in all, this means that the speckle pattern causes an increased noise level in connection with the detection of changes, which together with the deteriorated signal/clutter ratio results in insufficient performance for detection of objects under vegetation.

Broadband low-frequency SAR is a technique for reproducing static objects in forest ground. The low frequencies have the property of penetrating vegetation with insignificant attenuation and only causing weak backscattering from the coarse structures of the trees. By means of low-frequency SAR, static objects such as stationary vehicles can be detected even in very thick forest, which has been demonstrated in recent years. However, a problem is that the number of false alarms is large for a reasonable detection probability. The reason is that a large number of naturally occurring objects, e.g. large trees, big rocks, rock ledges, give a signature which resembles the signature one wishes to detect. For objects of the same order as the resolution, such as vehicles, the signature supplies essentially information on the size of the object whereas the shape of the object is ambiguous. For objects that are much larger than the resolution, for example bigger houses, also the shape can be used, which reduces the number of false alarms.

SUMMARY OF THE INVENTION

In view of the discussion above, it would be great progress if the SAR technique could be improved so that detection of changes can be combined with low-frequency SAR with high sensitivity to detection of objects, e.g. concealed in forest vegetation, and at the same time little probability of false alarms. An object of the invention is to solve this problem, through a method of detecting objects that change with time within a ground area, by means of a radar with synthetic aperture, a SAR radar, supported by a platform in essentially rectilinear motion during a synthetic aperture. The method includes the steps of transmitting radar pulses with a fractional bandwidth which is greater than or equal to 0.1 and using in the calculations an aperture angle which is greater than or equal to 0.1 radians, and registering the reflected radar pulses with amplitude and phase. For each pulse, the position of the antenna which transmits the pulse and the antenna which receives the pulse are measured, or calculated, and stored. The method proceeds by generating a two-dimensional SAR image with cylinder geometry from each synthetic aperture, and reproducing the ground area at least twice in succession from synthetic apertures. Starting from the two-dimensional SAR images, the images are matched with each other by a method in which each image position in one image is associated with the same ground area in the other image. Knowing location data of the antennae and based on the fact that the cylinder geometry of the SAR images is projected onto the ground surface, the images are filtered so that only common spectral components of the ground reflectivity are extracted and used in the matching.

The method according to the present invention may further include the steps of backprojecting the SAR images to a three-dimensional calculation grid, where the horizontal separation between the grid points is determined by the ground-projected resolution and the vertical separation between the grid layers is determined by focusing depth with regard to the geometry of the straight paths relative to each other, along circles defined by the intersection between range cylinders and azimuth planes for the respective straight paths; in other words, for each grid point, a value given by interpolation of the SAR signals to the range and azimuth position of the given point is assigned, and the signals are filtered to extract the common spectral components of the ground defined by the intersection between the transfer function of each SAR image projected onto the ground surface. The best match between the images with regard to the vertical position is then selected.

The present invention may also include the steps of using, in the final filtering, the average value within a small area round each image position, and selecting the best image match by maximizing the cross-correlation for the back-projected and filtered SAR signals. In addition, a changed object may be detected through comparison with a threshold value. The method may include using at leas two separated antennae in the antenna array and using the measured differential range differences to decide from which side of the straight path the object originates, and radar frequencies below 1 GHz may be used.

BRIEF DESCRIPTION OF THE DRAWINGS

The invention will now be described in more detail with reference to the accompanying drawings, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

The invention is based on three basic properties of low-frequency SAR systems with a great fractional bandwidth. In this context, great fractional bandwidth aims at the fact that the geometric resolution should be of the wavelength order. From equation 1 follows the condition that the fractional bandwidth ($B/f_c$) and the aperture angle ($\Delta\theta$) should be greater than about 0.1. The aperture angle is in this case expressed in radians. The corresponding requirement as to the projection angle is $\psi<85°$.

First, the low frequency means that the reproduced ground structures are in the size of a meter, or larger, such as the trunk and big branches of a tree. In most cases these have the property of being mechanically rigid and changing only very slowly with time, such as a growing tree. Exceptions from this rule are unusual, for example that a tree falls over owing to the wind or caused by a stroke of lightening. As a result, the clutter signal is in most cases invariable in time, i.e. the temporal correlation is high.

Second, the great fractional bandwidth means that the clutter signal from a ground surface very slowly changes its character with the angle of observation. Structures having a vertical extent within a resolution cell, however, is an exception, for example steep topography as $\psi$ approaches 90°. On the other hand, in connection with forest the low-frequencies means that the clutter signal in most cases is dominated by the corner reflection against ground and trunk, which has the property of appearing to originate from close to the ground surface. Also in this case, the clutter signal changes relatively slowly. As a result, the clutter signal is essentially unchanged in space, i.e. the spatial correlation is high.

Third, the great fractional bandwidth means that the geometric distortions between different SAR images, with which a detection of changes is to be performed, can be great. Such a distortion occurs when the straight paths do not coincide and implies that the SAR images do not match with each other. A robust method for detection of changes must thus calculate and make corrections for the geometric distortion that arises between SAR images. For high-frequency narrowband SAR this problem never arises since the speckle decorrelates for such small straight path deviations that the distortion is no problem.

Figure 1:
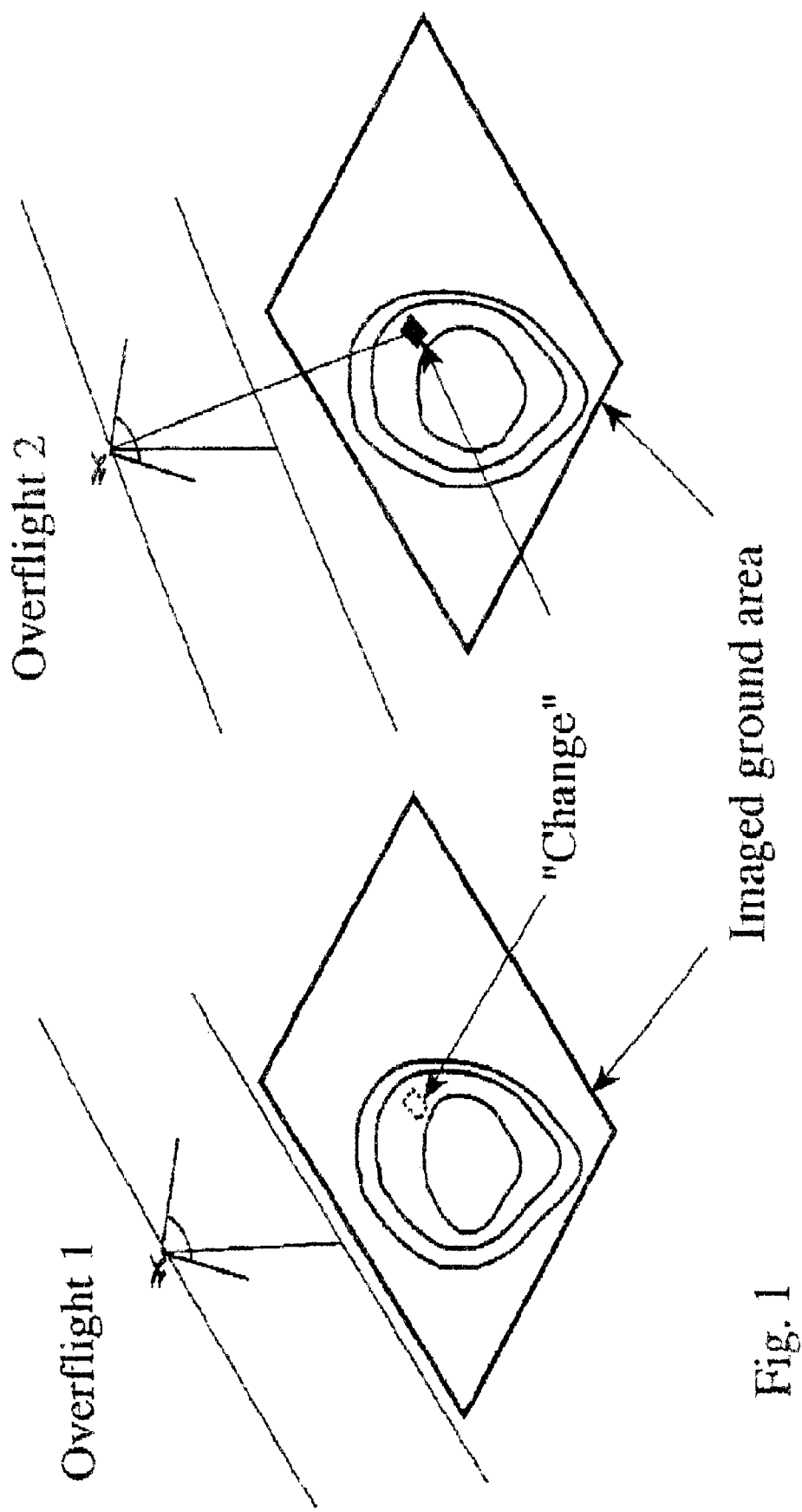
FIG. 1 shows the principle of detection of changes according to the invention when overflying a ground surface twice.
Figure 2:
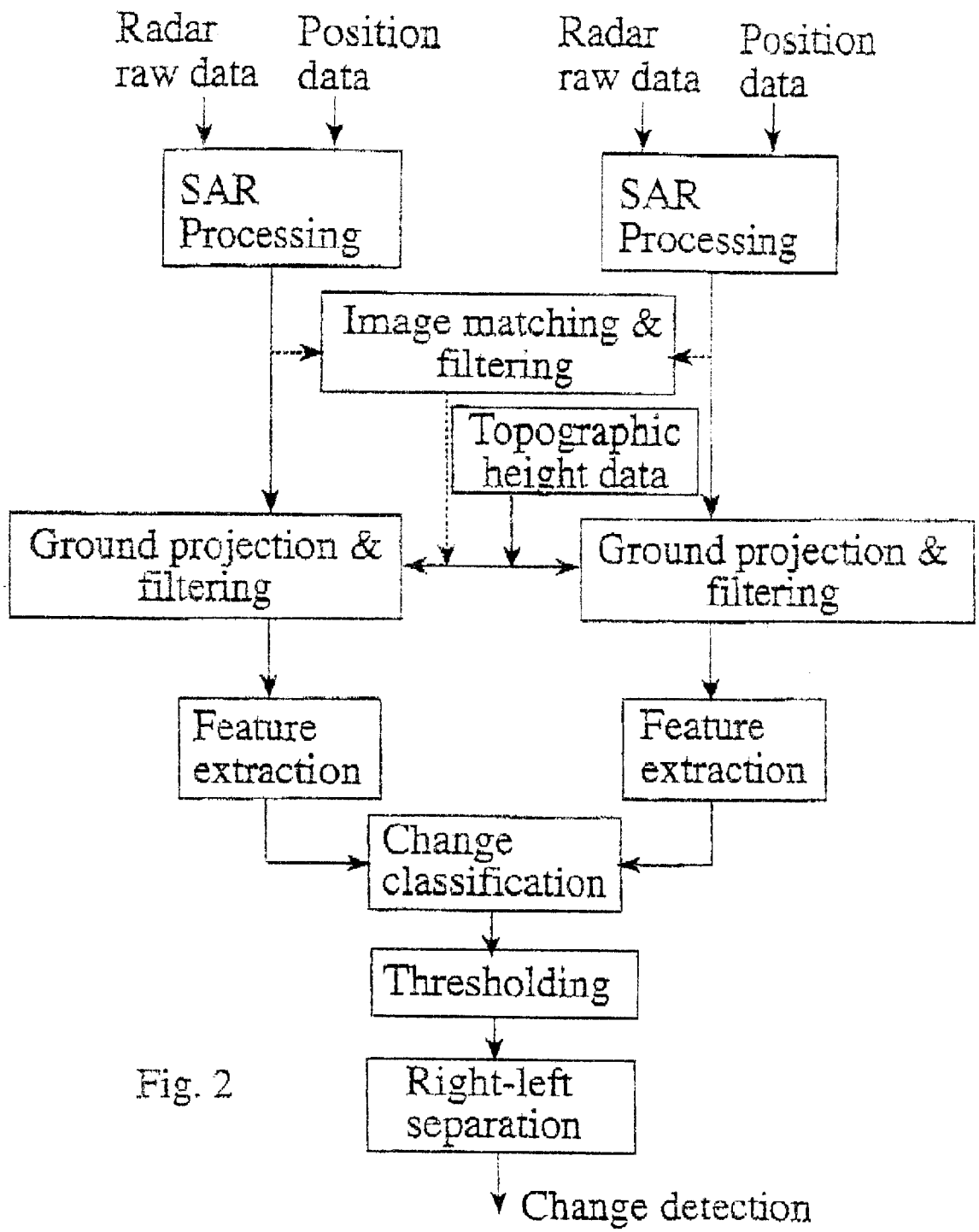
FIG. 2 is a flow chart of essential steps in connection with the invention.

In connection with FIG. 2, the invention will be described below in its three main components: 1) Radar registration and image generation, 2) Image matching and ground projection, and 3) Detection of changes.

1) Radar Registration and Image Generation

The first step of the invention consists of registration along an essentially linear straight path of radar raw data, i.e. the return signal from a transmitted radar pulse, and development of SAR images from at least two overflights of the same ground area.

The limited space for a radar system on an airborne platform means essentially that radar antennae at low frequencies have a low directivity, i.e. they are essentially omnidirectional. After pulse compression the radar signal can consequently be described as a function f(t, r) where t is the time and r is the range from the radar antenna. It is to be noted that the angle information is missing for an individual radar return. The position of the radar antenna as a function of the time can be obtained from the navigation system of the platform or be calculated.

Figure 3:
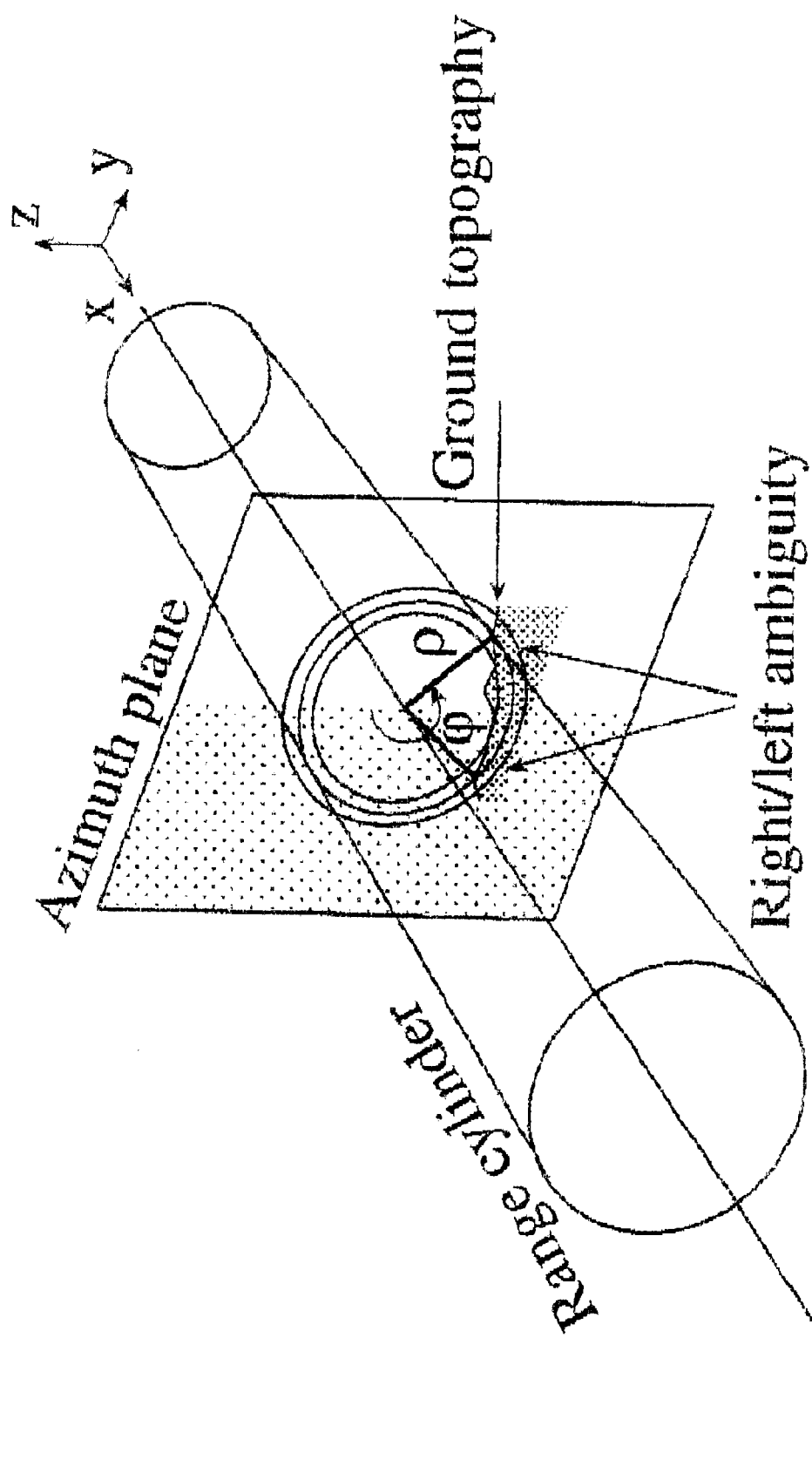
FIG. 3 shows the cylinder geometry of SAR measurement of the ground along a straight path.

Given an essentially linear path for the radar antenna during a synthetic aperture, f(t, r) is transformed to a SAR image g(x, ρ) where x and ρ are cylinder co-ordinates. The co-ordinate x is the azimuth range along the path and ρ is the perpendicular range away from the path according to FIG. 3. The three-dimensional position of the objects is thus obtained as the intersection between a circular cylinder (the range cylinder with the straight path as symmetry axis) and two surfaces, one of which is a semiplane orthogonal to the cylinder axis (azimuth plane) and the other represents the ground surface.

It is to be noted that a three-dimensional position determination is not possible without knowing the topography of the ground surface since information is missing about the third cylinder co-ordinate, the angle $\psi$ in the plane orthogonal to the straight path. The reproduction is not quite unambiguous even in the simplified case with a known plane ground surface since the actual position of the object can be on either side owing to the symmetry of mirroring through the straight path. By using at least two separated antennae, this ambiguity can essentially be avoided by the range difference to the antennae being used to determine from which side the signals originate.

The generation of SAR images from the radar signal occurs by means of a prior-art signal processing method for broadband and broadlobe SAR. Swedish Patent 8406007-8 (456,177) and the corresponding PCT application, resulting in, inter alia, U.S. Pat. Nos. 4,866,466 and 4,965,582, as well as Swedish Patent Application 9503275-1 and the corresponding PCT Application SE96/01164, disclose embodiments of such SAR reproduction, which are herewith incorporated by reference.

2) Image Matching and Ground Projection

The SAR images that are used for detection of changes represent reproductions of the same ground area at different points of time over the same area. As mentioned above, these images generally have different geometries since the straight paths are different. The second step of the invention therefore consists of matching the images with each other by an associating process. A similar process for developing a three-dimensional location description of the ground is disclosed in Swedish Patent Application 9702331-1 and the corresponding PCT Application SE 96/01147, which are herewith incorporated by reference.

First a calculation volume is defined, which circumscribes the expected topographic height variation. Then each SAR image is projected backwards, i.e. each image position is allowed to propagate along circular arcs which are defined by the intersection between the range cylinder and the azimuth plane, in the calculation volume. The signal for each element in the calculation volume is determined by interpolation, for example with a windowed sinc function or the like, from the respective SAR images. By this method, the backprojected signals for an object will coincide exactly in the calculation element which corresponds to its three-dimensional position.

In the present invention, the objective is not in the first place to generate topographic height information, but instead to ensure matching SAR images before the detection of changes. The calculation volume is defined as a number of layers with a separation which is directly tuned to the difference between the straight paths. The vertical separation should be smaller than the focusing depth, i.e. so that the backprojected signals for an object significantly overlap in the calculation volume. In case of identical straight paths, it is possible to choose an arbitrary layer or refrain entirely from backprojection and still obtain a perfect match. For any other case, provided that the topography is not known a priori, it is necessary to process several layers to obtain optimum results.

Figure 4:
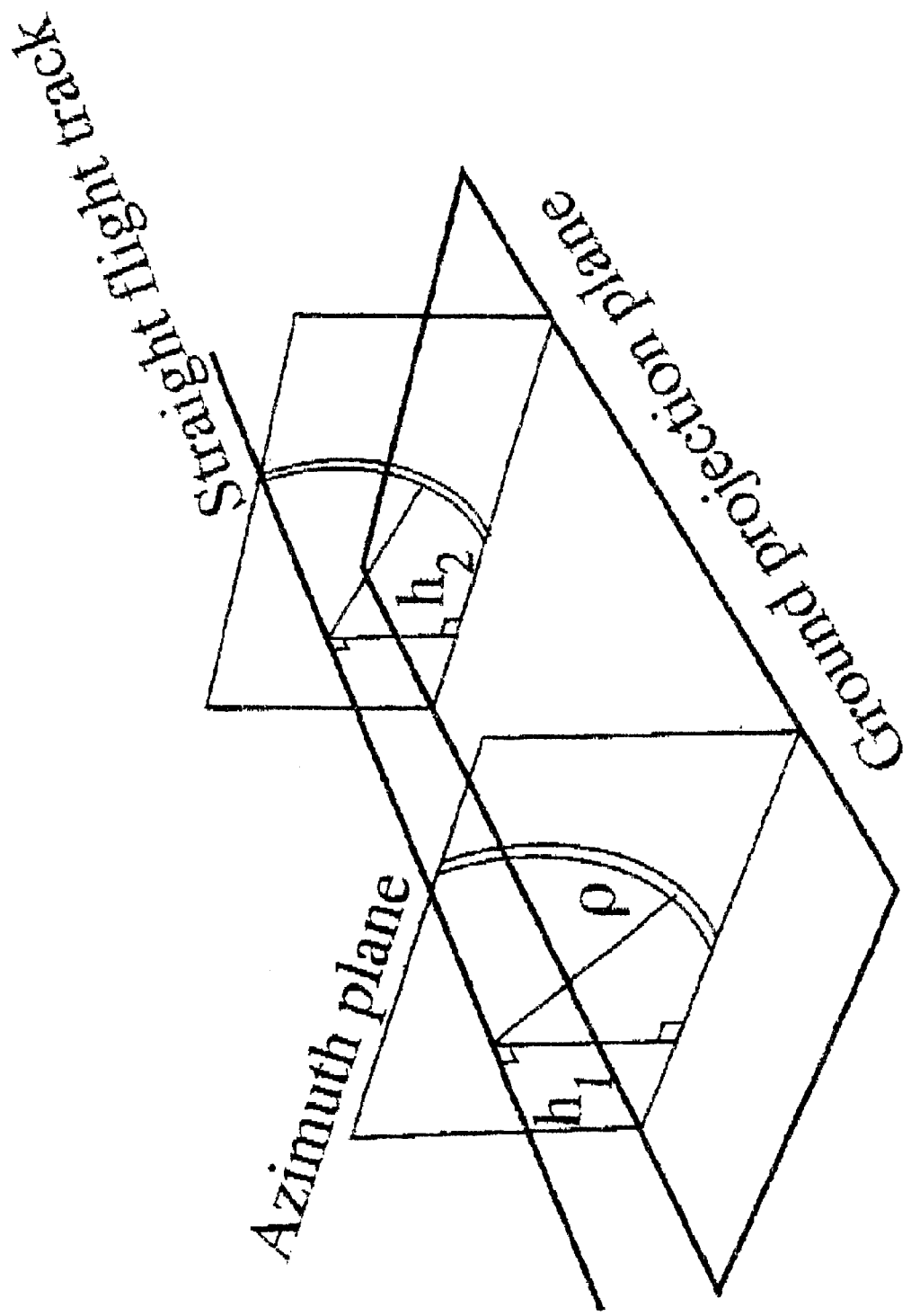
FIG. 4 shows a straight path and a layer in the calculation volume in an embodiment of the invention.

Now consider a case, according to FIG. 4, where a layer is illustrated together with the straight path of the SAR image. Each line in the SAR image, i.e. constant azimuth position, is projected won onto the line which is given by the intersection between the azimuth plane and the ground layer. The height h is obtained as the shortest distance between this line and the straight path. For each line, the SAR image is at the same time projected backwards to the other layers in the calculation volume, and then the next line is processed until the entire volume is filled. It should be noted that the height varies with the azimuth position since the straight path and the normal vector of the layer generally are not orthogonal. The corresponding procedure is repeated for the other straight paths. To represent the SAR images in the same co-ordinate system, the calculation volumes are finally rotated. The angle of rotation is determined by the geometry of the straight paths. The maximum angle of rotation that can be tolerated is directly associated with the geometric resolution along the flight path according to equation 1, i.e. in the order of Δθ.

Like in the above-mentioned method for determining a three-dimensional location description, the signals are now filtered and the position of the ground surface is detected for maximum cross-correlation. For each SAR image, an image projection is calculated, which thus directly can be superposed on the other images and point by point represent the same ground area. The filtering of the signals extracts the common spectral components of the reflectivity of the ground, whereas the remaining components are rejected, which results in improved cross-correlation and detection performance.

Figure 5:
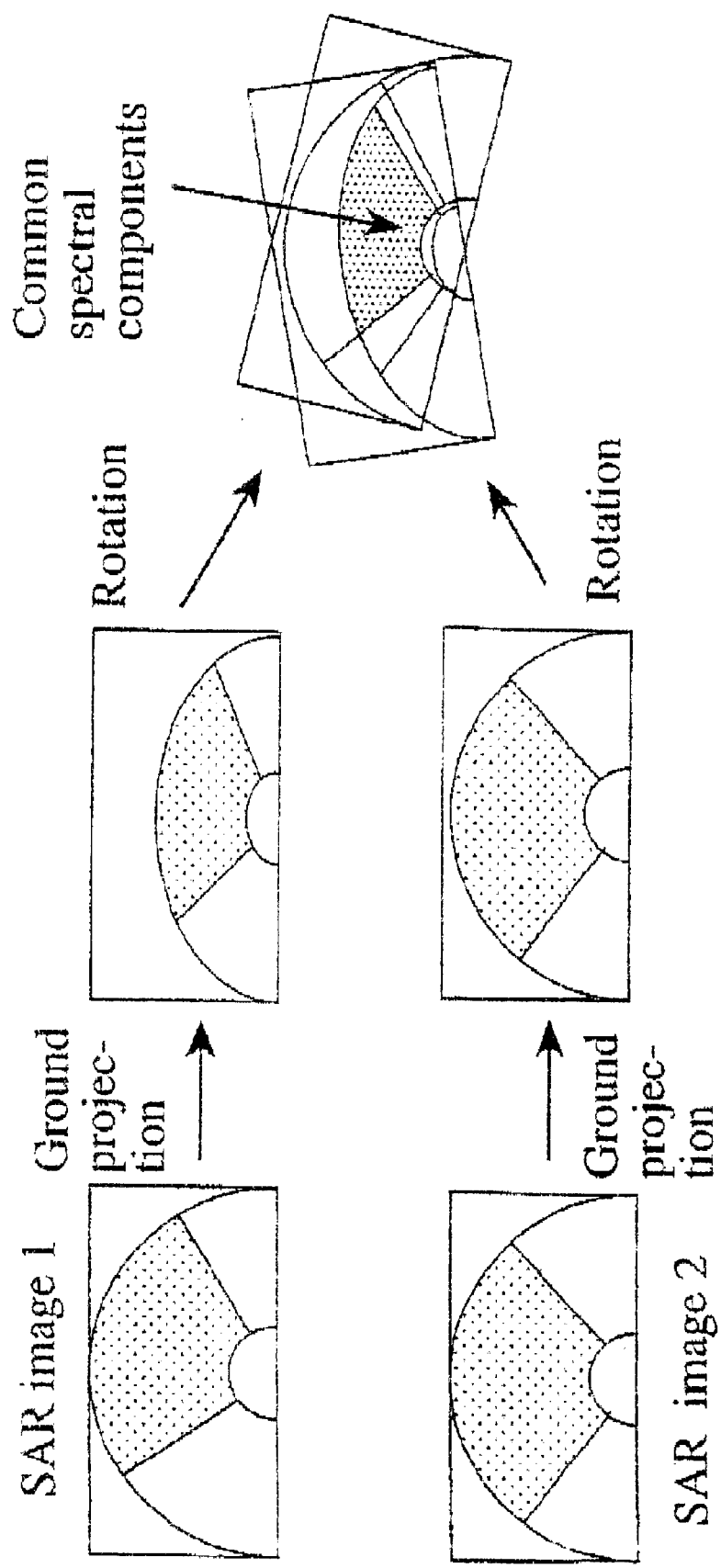
FIG. 5 shows the principle of filtering according to the invention when over flying twice.

The principle of filtering is illustrated in FIG. 5, in which the same ground area has been reproduced from different straight paths. The spectral components of the SAR images are defined by the area between two circles, whose radii are defined by the maximum and minimum transmitted frequency, and an angular sector, defined by the aperture angle Δθ, which is scaled through the respective ground projection and turned by rotation of the calculation volumes. Only the section between the two spectral areas in the ground-projected spectral areas in common to both images and the remaining spectral components are rejected by the filtering.

3) Detection of Changes

The last and final step of the invention is detection of changes between the ground-projected SAR images. Such a detection is based on prior-art methods for classification of multilayer images, where each layer consists of a SAR image for a certain point of time. The various layers thus represent the time sequence for a certain ground area. In classification, one or more features from each position in the SAR image is calculated so that a maximum discrimination of changes is obtained. Such a feature is, for example, the average value within a small area round each image position, but the feature vector can also contain higher order statistical dimensions.

Provided that the total number of changes is small, it is possible to estimate the multidimensional statistical distribution for the undesired signal, i.e. for no change, in the SAR images, and calculate an image of the desired signal, i.e. of the change, in which the undesired signal is maximally suppressed. Thus, a transformation matrix T is estimated, which operates on the feature vector X and results in the change image Y according to the formula $$Y=T \cdot X \qquad (2)$$

Figure 6:
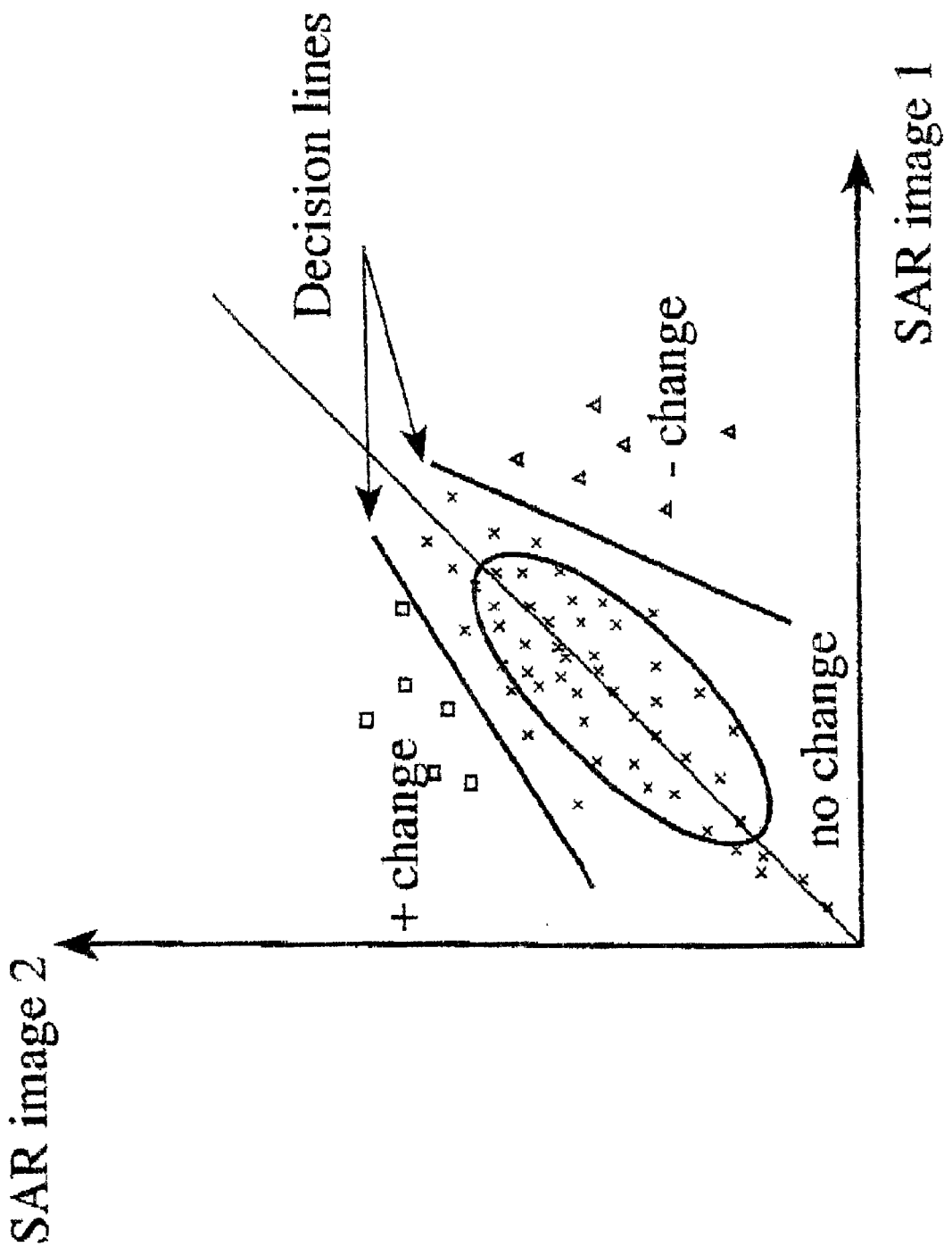
FIG. 6 illustrates classification of a feature in a case involving two SAR images according to an embodiment of the invention.

Such a change image can be classified by simple thresholding, for example with a given number of false detections—so-called CFAR detection. The classification is illustrated in FIG. 6 for a case of one feature and two SAR images. The undesired signal is positioned essentially along the diagonal and the desired signal is thresholded by selecting optimal decision surfaces to define the matrix T. It is to be noted that as a rule T is different when the objects are added to or disappear in the time sequence.

Finally, the number of false detections is reduced to improve the performance. The first measure is to compare the image position of the detected object in the two separated antenna channels. By means of the range difference between the channels it is possible to determine whether the object in fact originates from the mirror-symmetrical position on the other side of the straight path caused by signal leakage through the side lobes of the antenna. If this is the case, a false detection is established. It is also possible to investigate whether the object is unusually strong, in which case a false detection is in most cases involved, caused by a side lobe of the impulse response. To minimise the latter type of false detections, the SAR images are to be calibrated spectrally, i.e. so that they have exactly the same transfer function.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method of detecting an object that changes with time within a ground area using a SAR radar, supported by a platform in essentially rectilinear motion during a synthetic aperture, comprising the steps of:

transmitting radar pulses with a fractional bandwidth which is greater than or equal to 0.1 and using in calculations an aperture angle which is greater than or equal to 0.1 radians, said fractional bandwidth being a ratio between bandwidth and center frequency;

registering reflected radar pulses with amplitude and phase;

for each pulse, measuring, or calculating, and storing a position of the antenna which transmits the pulse and of the antenna which receives the pulse;

generating a two-dimensional SAR image with cylinder geometry from each synthetic aperture;

reproducing the ground area on a ground surface at least twice in succession from synthetic apertures while moving along straight paths;

starting from the two-dimensional SAR images, matching at least two of the SAR images with each other by a method in which each ground area in one image is associated with the same ground area in the other image and, knowing the position and location data of the transmitting and receiving antennae and that the cylinder geometry of the SAR images is projected onto the ground surface, filtering the images so that only spectral components of ground reflectivity common to the at least two SAR images are extracted and used in the matching.

2. The method as claimed in claim 1, further comprising the steps of backprojecting the SAR images to a three-dimensional calculation grid having a plurality of grid layers and a plurality of grid points, where horizontal separation between the grid points is determined by the ground-projected resolution, and vertical separation between the grid layers is determined by focusing depth with regard to geometry of the straight paths relative to each other, along circles defined by the intersection between range cylinders and azimuth planes for the respective straight paths; extracting by filtering the common spectral components of the ground defined by the intersection between a transfer function of each SAR image projected onto the ground surface; and selecting a best match between the images with regard to vertical position.

3. The method as claimed in claim 2, further comprising the steps of using in the filtering step an average value within a small area round each image position, and selecting a best image match by maximizing cross-correlation for the back-projected and filtered SAR signals.

4. The method as claimed in claim 1, wherein a changed object is detected through comparison with a threshold value.

5. The method as claimed in claim 1, further comprising the steps of using at least two separated antennae and using measured differential range differences to decide from which side of the straight paths signals from the object originate.

6. The method as claimed in claim 1, wherein radar frequencies used are below 1 GHz.

7. A method of detecting an object that changes position with time within a ground area using a SAR radar, supported by a platform in essentially rectilinear motion during a synthetic aperture, comprising the steps of:

transmitting radar pulses with a fractional bandwidth which is greater than or equal to 0.1, said fractional bandwidth being a ratio between bandwidth and center frequency;

registering reflected radar pulses with amplitude and phase and, for each pulse, determining a position of the antenna which transmits the pulse and of the antenna which receives the pulse;

generating a two-dimensional SAR image with cylinder geometry from each of at least two flights over a same ground area to generate a plurality of SAR images, each of said two flights moving along a straight path; and matching at least two of said plurality of SAR images with each other by associating corresponding image positions therein and, knowing the position of the transmitting and receiving antennae and that the cylinder geometry of the SAR images is projected onto the ground surface, filtering the images so that only spectral components of ground reflectivity common to both of said at least two SAR images are extracted and used in the matching.

8. The method as claimed in claim 7, further comprising the step of:

backprojecting the SAR images to a three-dimensional calculation grid having a plurality of grid layers and a plurality of grid points, where horizontal separation between the grid points is determined by the ground-projected resolution, and vertical separation between the grid layers is determined by focusing depth with regard to geometry of the straight paths relative to each other, along circles defined by the intersection between range cylinders and azimuth planes for the respective straight paths.

9. The method as claimed in claim 8, further comprising the steps of using in the filtering step an average value within a small area round each image position, and selecting a best image match by maximizing cross-correlation for the back-projected and filtered SAR signals.

10. The method as claimed in claim 7, wherein a changed object is detected through comparison with a threshold value.

11. The method as claimed in claim 7, further comprising the steps of using at least two separated and using measured range differences therebetween to determine from which side of the straight paths the object originates.

12. The method as claimed in claim 7, wherein radar frequencies used are below 1 GHz.

13. The method as claimed in claim 7, wherein the straight paths are different.

14. The method as claimed in claim 7, wherein the straight paths are essentially identical.

* * * * *